(No Model.)

W. MARSHALL.
SYSTEM OF ELECTRICAL DISTRIBUTION.

No. 472,193. Patented Apr. 5, 1892.

Witnesses.
John F. Nelson
Elizabeth A. Stockbridge

Inventor.
William Marshall
by G. H. Stockbridge
Attorney.

UNITED STATES PATENT OFFICE.

WILLIAM MARSHALL, OF NEW YORK, N. Y.

SYSTEM OF ELECTRICAL DISTRIBUTION.

SPECIFICATION forming part of Letters Patent No. 472,193, dated April 5, 1892.

Application filed February 28, 1891. Serial No. 383,283. (No model.)

*To all whom it may concern:*

Be it known that I, WILLIAM MARSHALL, a citizen of the United States, residing at New York, in the county of New York and State of New York, have invented certain new and useful Improvements in Systems of Electrical Distribution; and I do hereby declare the following to be a full, clear, and exact description of the invention, such as will enable others skilled in the art to which it appertains to make and use the same.

The improvements which are contemplated by my invention relate to systems of electrical distribution. They are concerned, primarily, with a system in which a direct current of high tension is conveyed to a distributing-point, where condensers are provided which are alternately charged by the high-tension current and then discharged through the translating devices placed in local circuits. Ordinarily the discharge effect of the condenser is added to the current from the primary generator and the alternation being rapidly accomplished by means of a suitable commutator or circuit-changer the translating devices are acted upon by a current which is practically continuous, though really interrupted with great frequency. It is customary to distribute high-tension currents in the alternating form over small wires, which are comparatively inexpensive, and then to reconvert the alternating current into straight or direct currents at the point of distribution. With my system the same thing can be accomplished for high-tension direct currents, as it is evident that the condensers can be charged at a great distance over a small wire without difficulty. My system, then, contemplates the carrying of the direct current for a long distance over a small wire and then effecting the distribution by means of condensers, the circuits being controlled and operated by a quick-acting switch or commutator, preferably automatic.

Figure 1:
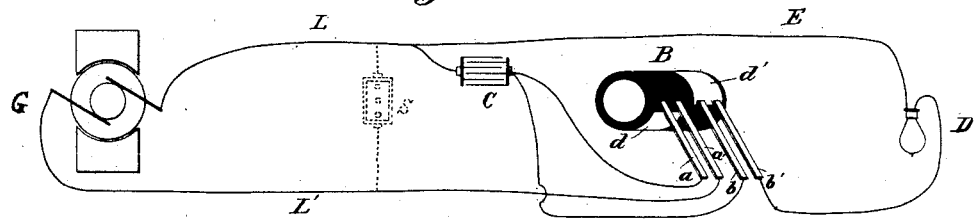
Figure 2:
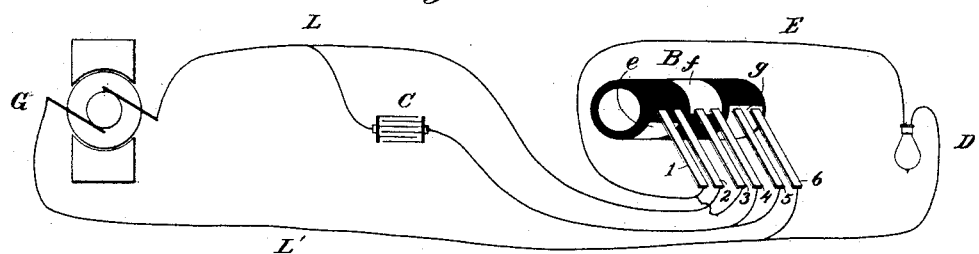
Figure 3:
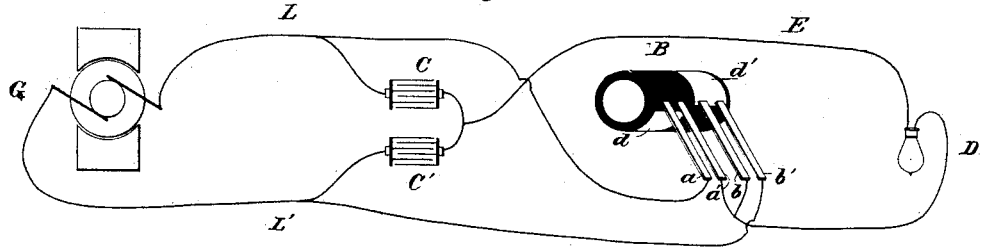
Figure 4:
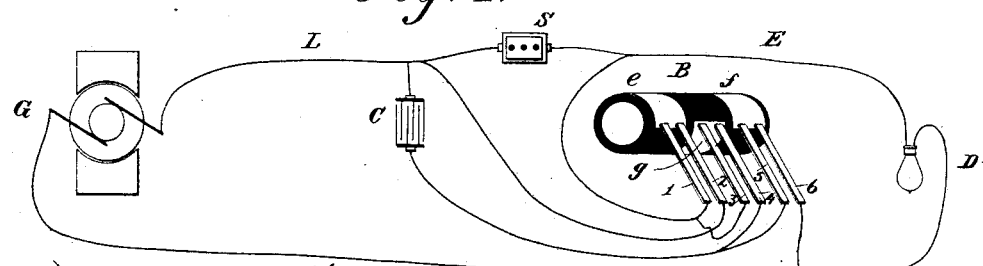

In the accompanying drawings, which illustrate my invention, Figure 1 shows a complete circuit equipped with a generator, condenser, and commutator connected with a translating device in the form of an incandescent lamp. Fig. 2 illustrates, diagrammatically, a different arrangement of the parts, the special point of difference being the commutator connection for charging and discharging the condenser. Fig. 3 shows an arrangement in which condensers charged by a high-tension continuous current discharge an alternating current through the consumption-circuit, and Fig. 4 illustrates a modification.

Referring to Fig. 1, G represents a source of electrical energy, such as a dynamo-electric machine capable of supplying a continuous current. From the dynamo a conductor L leads to one pole of a condenser C at a distant station. From the other pole of the dynamo a conductor L' leads to a spring-contact $a'$, which rests upon the cylinder of a commutator B at the local station. On the cylinder of the commutator are two metallic strips $d\ d'$. Upon these strips, respectively, are adapted to rest in pairs the springs $a\ a'$ and $b\ b'$. The two former springs rest upon the strip $d$ and the two latter upon the strip $d'$; but the relations are such that when one pair of springs is resting upon $d$ the other pair shall be out of contact with $d'$, and vice versa. The spring $a$ is connected by a suitable conductor to one pole of the condenser C, and the same pole is connected to the spring $b$. The spring $b'$ is joined through the translating device D by a wire E with the opposite pole of the condenser—that is to say, the same pole with which the wire L is connected.

It will be understood that the commutator-cylinder is made of insulating material, and I prefer that it should automatically, by any suitable means, be given a rapid rotation, which will cause the circuit to be alternately opened and closed between the strips $d\ d'$ and the corresponding pairs of contact-springs. Now when the springs $a\ a'$ are in contact with the strip $d$ there will be a complete circuit from the generator through the condenser, the circuit through the translating device being open at the commutator. When now the commutator is turned slightly farther, so as to bring the springs $b\ b'$ into contact with $d'$, the condenser will be discharged and will alternate its effect with the current from the dynamo, thus operating the translating device with the alternating effect of the two. Though only one station is shown, it is evident that any number of stations may be equipped with condensers and charged from one generator, and I do not confine myself to one set of condensers at a station, but I may use as many as may be found practicable.

In Fig. 2 the generator and translating device are related in the same manner as in Fig. 1; but the commutator is provided with three conducting-strips $e\ f\ g$ in place of the two described above and with three pairs of contact-springs corresponding to the strips. The line L goes, as before, to the condenser C, a branch being taken off and passing to the spring 2. From the other pole of the condenser branches go to springs 4 and 5. The line L' divides, a part going through the translating device D to the springs 1 and 3 and a part going directly to the spring 6.

The arrangement of the contact springs and strips is as follows: When the springs 3 and 4 are in contact with the strip $f$, the springs 1 and 2 and 5 and 6 are off their corresponding contact-strips. The circuit will then be through the conductor L', translating device D, spring 3, strip $f$, spring 4, condenser C, and back through conductor L. With this connection the condenser C is charged. Now before the springs 3 and 4 leave the strip $f$ I prefer that springs 5 and 6 should be connected through the strip $g$, and immediately after the springs 3 and 4 leave the strip $f$ I cause the springs 1 and 2 to make contact with the strip $e$. I thus throw the currents of the condenser and generator simultaneously through the translating devices, the order of the operations being as follows: The condenser is first charged over a circuit including the translating device. Then the translating device is short-circuited by a circuit through the condenser, and, finally, the condenser is discharged through the translating device or devices in such a manner that its current is added to that of the generator.

In Fig. 3 the commutator is constructed in the same manner as in Fig. 1; but I employ two condensers C and C', and I connect L to one pole of the former and L' to one pole of the latter. The opposite poles are joined together and are both connected by the circuit E through the translating device D to the springs $a'$ and $b$. The spring $a$ is connected to the wire L and the spring $b'$ to the wire L'. The pairs of springs, as before, are connected to their corresponding strips at different times and not simultaneously. It is evident that as the commutator revolves alternate discharges from the different condensers through the local circuit will take place and that these discharges, like those of the generator, will be in opposite senses.

In Fig. 4 I show an adjustable resistance S, by means of which the current on line may be regulated. This may be used or dispensed with at will. The connections here are the same as in Fig. 2, and I have only used Fig. 4 to illustrate the employment of the resistance. A similar resistance is shown in dotted lines in Fig. 1.

Having described my invention, I claim—

1. In a system of electrical distribution, a direct-current generator and a translating device in the circuit of the said generator, a condenser in a branch of the said circuit, and an automatic circuit-changing device having connections both to the branch or condenser circuit and to the main circuit containing the translating device, the said connections being such that the circuit is alternately set for charging the condenser and for discharging the same through the said translating device, as and for the purpose set forth.

2. In a system of electrical distribution, a direct-current generator and one or more translating devices in circuit therewith, a condenser or condensers in a branch of the said circuit, an automatic circuit-changing device having connections both to the branch or condenser circuit and to the main circuit, the said connections being such that the circuit is alternately set for charging the condenser or condensers and for discharging the same through the translating device or devices, and an adjustable resistance for regulating the amount of current through the condenser or condensers, as and for the purpose set forth.

3. In a system of electrical distribution, a direct-current generator, a main line connecting the said generator to a distant station, one or more condensers at the said distant station, translating devices at or near the said distant station, and automatic circuit-changing apparatus located between the said condenser or condensers and the said translating devices, whereby the current enters the condensing apparatus as a direct current and is discharged by means of circuit-changing devices into the working circuits, as and for the purpose set forth.

In testimony whereof I have signed my name, in the presence of two witnesses, this 26th day of February, A. D. 1891.

WILLIAM MARSHALL.

Witnesses:
JAMES GLENRY,
JOHN E. ROSS.